United States Patent [19]
Kropp

[11] Patent Number: 5,222,399
[45] Date of Patent: Jun. 29, 1993

[54] LOAD WASHER

[75] Inventor: Harry C. Kropp, Chicago, Ill.

[73] Assignee: Fel-Pro Incorporated, Skokie, Ill.

[21] Appl. No.: 794,486

[22] Filed: Nov. 19, 1991

Related U.S. Application Data

[63] Continuation-in-part of Ser. No. 649,446, Feb. 1, 1991, abandoned.

[51] Int. Cl.⁵ .................................................. G01L 1/16
[52] U.S. Cl. ............................. 73/862.68; 73/862.041
[58] Field of Search ............... 73/862.54, 862.68, 761, 73/862.04, 862.541, 862.041; 338/4, 47, 99, 114; 341/34; 310/366

[56] References Cited

U.S. PATENT DOCUMENTS

| | | | |
|---|---|---|---|
| 3,151,258 | 9/1964 | Sonderegger et al. | 73/761 X |
| 4,640,137 | 2/1987 | Trull et al. | 73/862.04 |
| 4,701,659 | 10/1987 | Fujii et al. | 310/366 X |
| 4,738,146 | 4/1988 | Baumgartner et al. | 73/862.68 |
| 4,765,423 | 8/1988 | Karpa | 73/862.65 X |

FOREIGN PATENT DOCUMENTS

| | | | |
|---|---|---|---|
| 0165631 | 7/1986 | Japan | 338/4 |
| 2115556 | 9/1983 | United Kingdom | 73/862.04 |

*Primary Examiner*—Donald O. Woodiel
*Assistant Examiner*—Elizabeth L. Dougherty
*Attorney, Agent, or Firm*—Dressler, Goldsmith, Shore, Sutker & Milnamow, Ltd.

[57] ABSTRACT

A load washer comprising a pair of thin metal washers between which a contact sensor is positioned. The contact sensor includes pairs of confronting electrodes at a plurality of spaced zones with a pressure sensitive resistive material between each pair, which, under pressure, provide an indication of the force applied to the load washer.

10 Claims, 3 Drawing Sheets

LOAD WASHER

RELATED APPLICATIONS

This application is a continuation-in-part of U.S. application Ser. No. 07/649,446 filed on Feb. 1, 1991, now abandoned.

BACKGROUND AND FIELD OF THE INVENTION

This invention relates to load washers. A variety of load washers are currently in use. These typically are used to test for loads applied to bolts and other elements which are compressed or tensioned thereby to provide accurate indications of the tensile or compressive loads applied. Currently available load washers are expensive and their structures are such that they must be removed from their environments of use after the testing or sensing process is completed.

It would be of advantage to provide load washers which provide accurate indications of the loads applied, which are inexpensive and which, when desired or appropriate, may be left in place.

SUMMARY OF THE INVENTION

In accordance with the present invention, an improved load washer is provided. It comprises a first thin plate defining an outer perimeter, a second thin plate defining an outer perimeter, and a load sensor positioned between the plates. The load sensor includes first electrode means, second electrode means crossing and intersecting the first electrode means to define intersections thereof within the outer perimeters, and a pressure sensitive, resistive material between the electrode means at the intersections. Conductors for the first and second electrode means extend beyond the outer perimeters, and each conductor means terminates in a contact.

Preferably the electrode means define intersections at a plurality of zones spaced equidistantly from each other and the zones each have plural intersections. Desirably there are at least three and preferably four equidistantly spaced zones.

The zones may have single pairs of intersecting, confronting electrodes, or may comprise multiple electrode elements constituting one or both of the confronting, intersecting electrodes.

In a preferred form, the load washer is generally circular in plan view and the zones are generally radially equidistant from the center of the load washer and are spaced equidistantly circumferentially from each other (along a circle generated about that radius).

The plates may be thin and flat. In one embodiment the second plate also defines an upstanding peripheral flange surrounding the first plate, and the load sensor is mounted therebetween. The load washer central opening is sized to receive a bolt.

Further objects, features and advantages of the present invention will become apparent from the following drawings and description.

DETAILED DESCRIPTION OF THE PRESENTLY PREFERRED EMBODIMENTS

Figure 1:
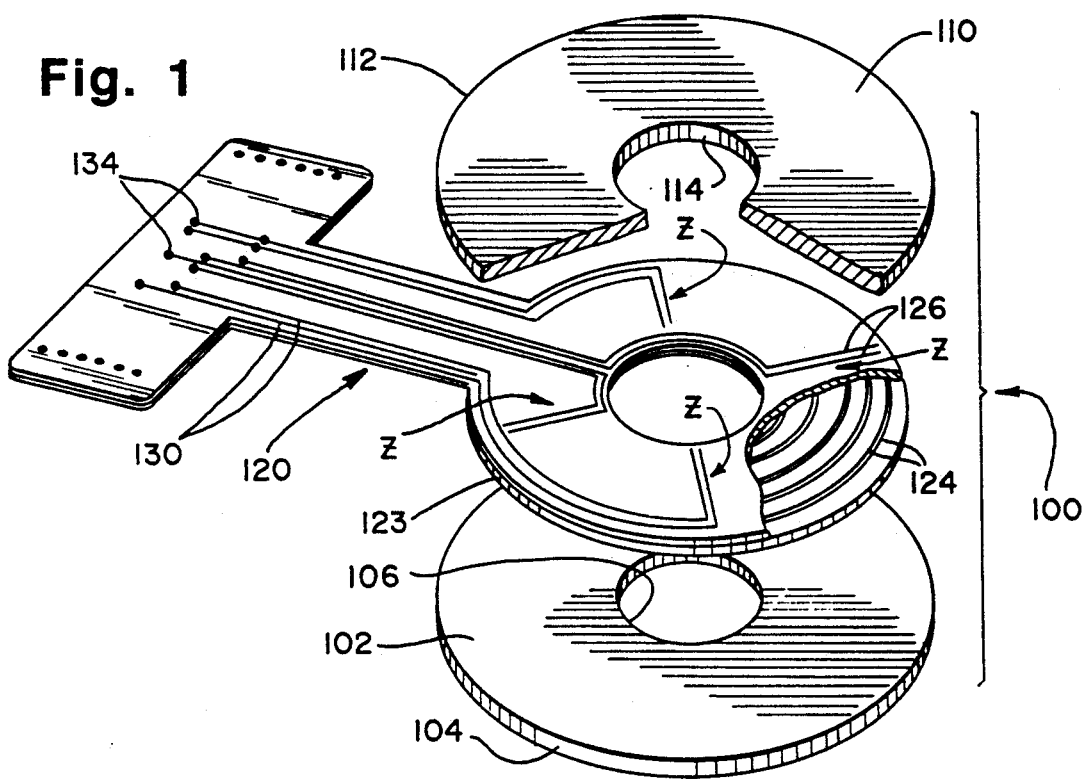
FIG. 1 is an exploded perspective view of a load washer of this invention.
Figure 2:
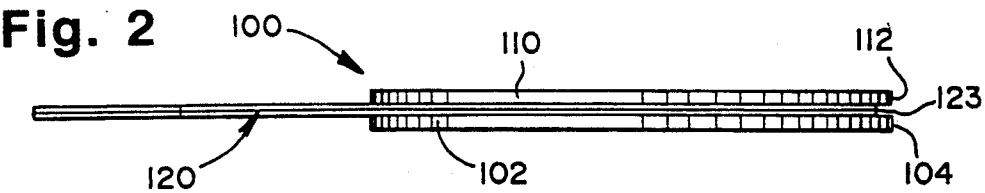
FIG. 2 is a side elevational view of the load washer of FIG. 1.
Figure 3:
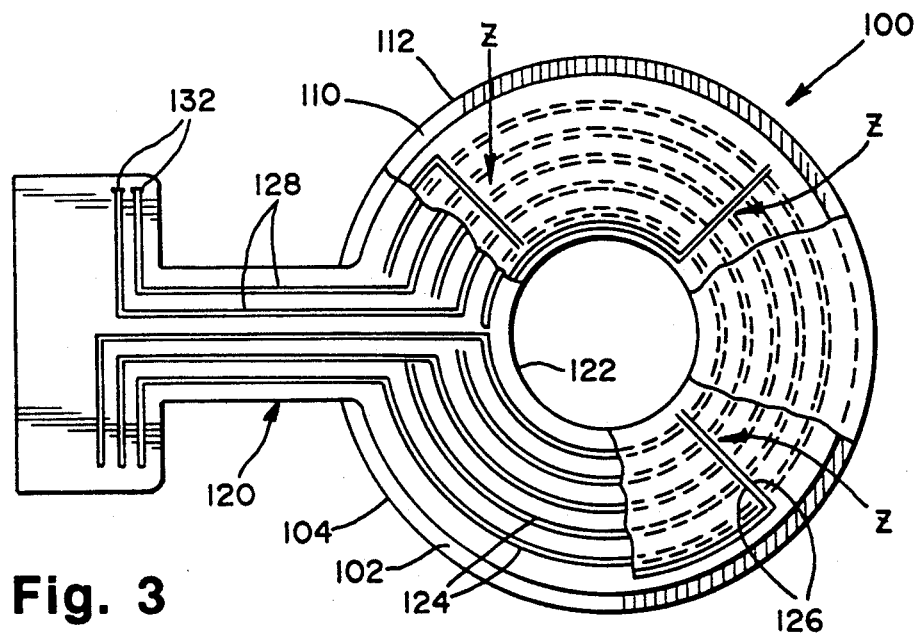
FIG. 3 is an enlarged plan view of a portion of the load sensor of FIG. 1.

Referring first to FIGS. 1 to 3 a preferred load washer, such as the circular load washer 100 of the present invention, is seen to comprise a first circular thin washer plate 102 defining an outer perimeter 104 and central hole 106, a second circular thin washer plate 110 defining an outer perimeter 112 and a central hole 114, and a load sensor 120, also defining a central hole 122. The perimeter 123 of the load sensor preferably lies within the perimeters 104, 112, except, of course where the electrode conductors project outwardly of the load washer 100.

A typical load sensor 120 may be made and constructed in accordance with the description in U.S. Pat. No. 4,856,993, the disclosure of which is here incorporated by reference. Thus load sensor 120 includes a thin flexible backing sheet on which a first electrode means, such as a first pair of parallel electrodes 124 are provided, and a second thin flexible backing sheet on which second electrode means 126 are provided. Electrodes 126 cross electrodes 124 in a crossing pattern to form a plurality of intersections, such as four intersections at each of a plurality of spaced zones Z.

Electrodes 124, 126 have a pressure sensitive resistive material disposed between them at the intersections and, under load, produce a variable resistance representative of the variable load applied at the intersections.

Each electrode 124, 126 is connected to a conductor 128, 130, respectively, which terminates in a contact 132, 134, respectively. The contacts are positionable in a connector, which in turn is connected to a multi-conductor cable for the measurement electronics, all as described and disclosed in U.S. Pat. No. 4,856,993. Thus, changes in resistance at zones Z may be ascertained and processed and used to provide outputs representative of the forces applied at the intersections in the several zones Z.

Load washer 100 defines a plurality of zones Z, such as two, three or preferably four zones as illustrated by the drawings, at which the first and second electrodes intersect. Each of the zones Z is preferably spaced equidistantly from the next adjacent zone and from each other. Thus the four zones Z shown in FIGS. 1 and 3 are spaced at ninety degrees apart from each other. Where the load washer is circular as illustrated, the zones are also preferably radially equidistant from the center of the load washer and are spaced equidistantly from each other circumferentially along a circle generated about that radius.

Typically the plates 102 and 110 are thin and flat and the load sensor is permanently mounted therebetween, as via a very thin, uniform layer of adhesive bonding each face of the load sensor to the confronting plate surface. In a typical embodiment the load washer may be slightly in excess of ⅛ in thickness, comprised of plates of about one-sixteenth inch in thickness, and a load sensor about 0.004 inch thick, with adhesive layers, such as of an epoxy, totalling no more than about 0.001 inch in thickness. The load washers may be about 1½ inches in diameter, with a ½ inch central hole.

Figure 4:
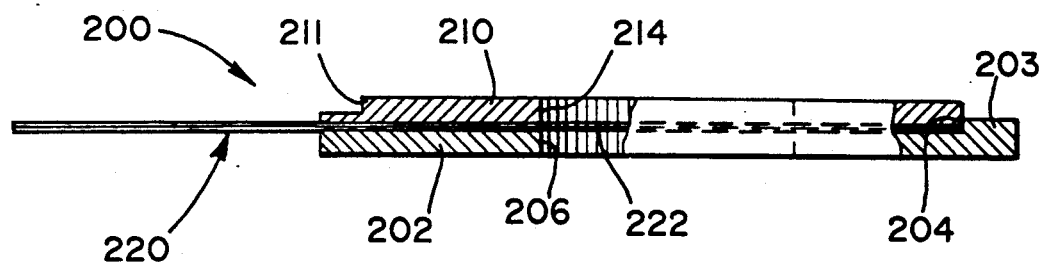
FIG. 4 is a side elevational view of an alternative load washer of the present invention.
Figure 5:
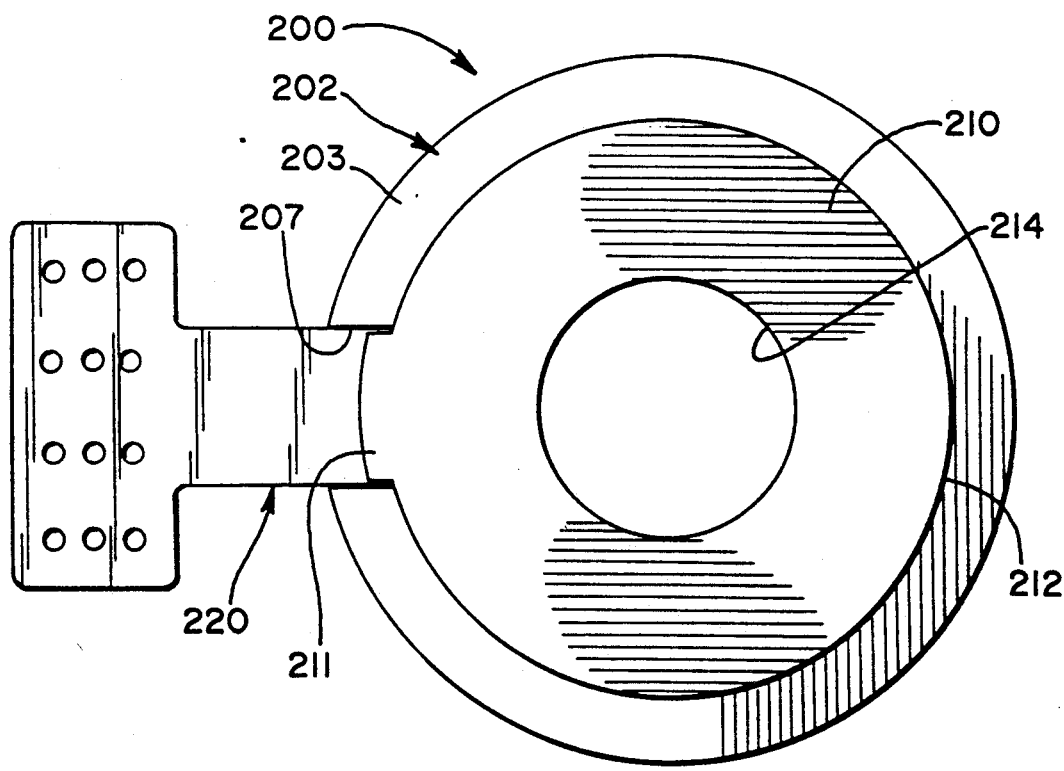
FIG. 5 is a plan view of the load washer of FIG. 4.

In another form of the invention shown in FIGS. 4 and 5, a load washer 200 is seen to comprise a first, thin generally circular washer plate 202 defining a circular flange 203, central hole 206 and a second circular thin washer plate 210 defining an outer perimeter 212 and a central hole 214. The configuration of the outer perimeter 212 may be very slightly less than the inner perimeter 204 of flange 203 so that it is received in a non-interfering fit. A load sensor 220, which may be the same as load sensor 120 and which defines a hole 222 coaxial with holes 206, 214 is positioned between plates 202 and 210 and lies within the inner perimeter 204 of the flange and perimeter 212, except, of course, where the electrode conductors project outwardly of the load washer through the opening at 207 in flange 203, thus also keying the load sensor relative to the plate 202. The height of flange 203 is less than the combined thickness of plate 210 and load sensor 220 so that under compression, flange 203 will not interfere with operation of the load washer. Although it need not be, load sensor 220 may be adhered between plates 202 and 210 in the same manner in which load washer 100 permanently mounts load sensor 120. The dimensions of the plates and load sensor of FIGS. 4 and 5 may be the same as or different from those of load washer 100. Preferably the plates of the load washers 100, 200 are of stainless steel to minimize potential "noise" problems.

Figure 6:
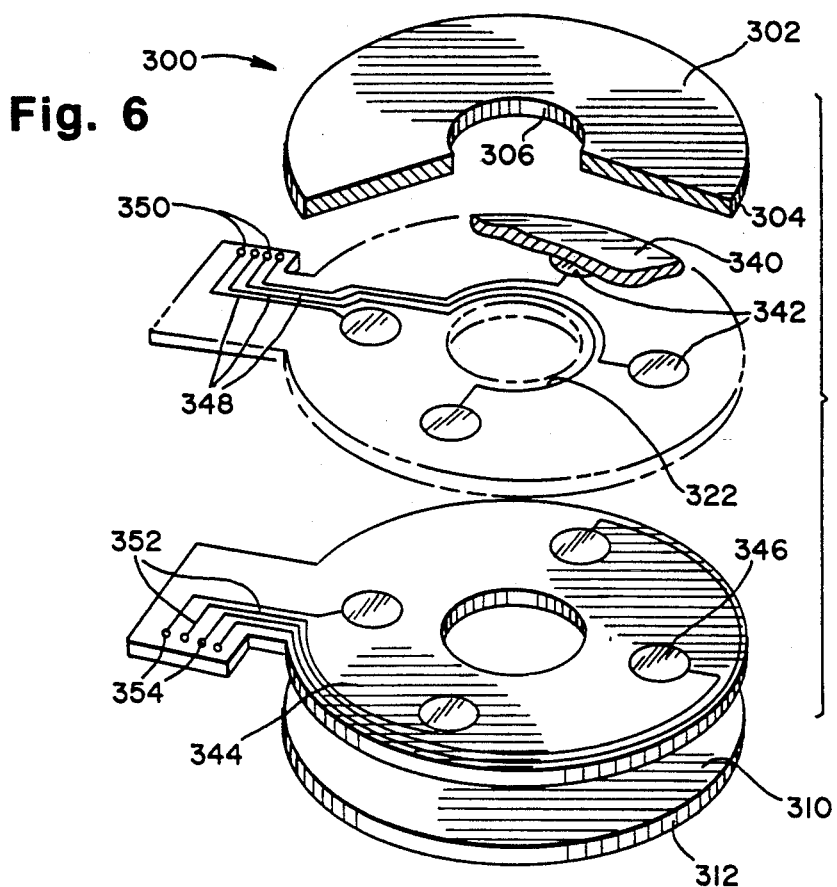
FIG. 6 is an exploded perspective view of yet another load washer of the present invention.
Figure 7:
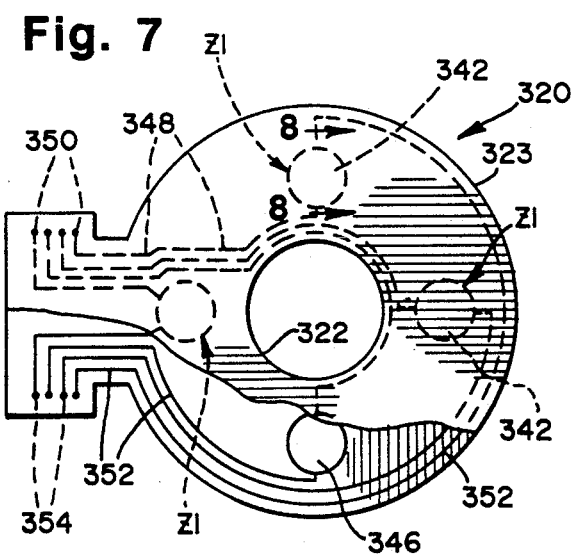
FIG. 7 is an enlarged plan view, partially broken away, of a portion of the load sensor of FIG. 6.
Figure 8:
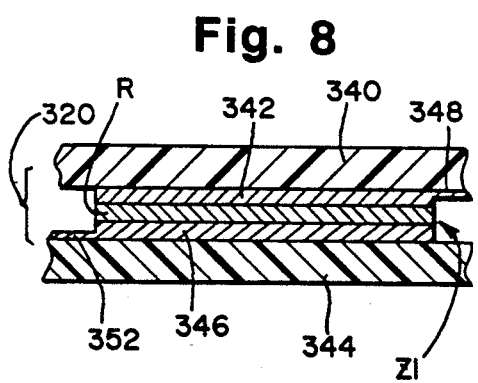
FIG. 8 is an enlarged schematic cross-sectional view taken generally along line 8—8 of FIG. 7.

Another load washer 300 made in accordance with the present invention is shown in FIGS. 6-8 and comprises a first circular thin washer plate 302 defining an outer perimeter 304 and central hole 306, a like second circular thin washer plate 310 defining an outer perimeter 312 and a central hole and a load sensor 320, also defining a central hole 322. The perimeter 323 of the load sensor preferably lies within the perimeters 304, 312, except, of course, where the electrode conductors project outwardly of the load washer 300.

A typical load sensor 320 may be fabricated of materials, such as the backing sheets, the pressure sensitive resistive material, and the deposited layers as described in U.S. Pat. No. 4,856,993. Thus load sensor 320 includes a thin flexible backing sheet 340, such as of a Mylar polyester film, on which first electrodes 342 are provided, and a second thin flexible backing sheet 344, as of a Mylar polyester film, on which second crossing or confronting electrodes 346 are provided. Electrodes 342 confront electrodes 346 at each of a plurality of spaced zones Z1.

Each of the pairs of electrodes 342, 346 has a pressure sensitive resistive material R disposed between them at their intersections. Under load, each pair of electrodes and the interpose resistive material produces a variable resistance representative of the variable loads applied at each of the zones Z1. Electrodes 342, 346 may be generally circular in plan view, and, where the load washer 300 is about 1½ inches in diameter, may be about one-quarter inch in diameter.

Each electrode 342, 346 is connected to a conductor 348, 352, respectively, which terminates in a contact 350, 354, respectively. The conductors 348, 352 may be traces printed on the inside surfaces of the backing sheets or may be otherwise formed. The conductors are preferably positioned on their respective backing sheets, as generally illustrated by FIG. 7, so that they do not intersect or cross so that no additional insulative layer or coating needs to be provided over them since they confront the insulative backing sheets. However, it may be desirable to overprint the conductors with an insulative coating generally as described in U.S. Pat. No. 4,856,993. The contacts 350, 354 are positionable in a suitable connector, which in turn is connected to a multi-conductor cable for the measurement electronics, which may be as described and disclosed in U.S. Pat. No. 4,856,993. Thus, changes in resistance at zones Z1 may be ascertained and processed and used to provide outputs representative of the forces applied in the several zones Z1.

Load sensor 300 defines a plurality of zones Z1, such as the four zones Z1 illustrated by the drawings, at which the first and second electrodes intersect or confront each other. Each of the zones Z1 is preferably spaced equidistantly from the next adjacent zone and from each other. Thus the four zones Z shown in FIGS. 6 and 7 are spaced at ninety degrees apart from each other. Where the load washer 300 is circular as illustrated, the zones are also preferably radially equidistant from the center of the load washer and are spaced equidistantly from each other circumferentially along a circle generated about that radius.

Typically the plates 302 and 310 are thin and flat and the load sensor is permanently mounted therebetween, as via a very thin, uniform layer of adhesive bonding each face of the load sensor to the confronting plate surface. The load washer may be slightly in excess of ⅛ in thickness, comprised of washer plates of about one-sixteenth inch in thickness, and a load sensor about 0.004 inch thick, with adhesive layers, such as of an epoxy, totalling no more than about 0.001 inch in thickness. The load washer 300 may be about 1½ inches in diameter, with a ½ inch central hole.

Load washers 100, 200 and 300 may employ surface ground plates to eliminate discontinuities in the surfaces to minimize aberrational results due to such discontinuities. The plates may be flat as illustrated, or may, where desired, assume other shapes, such as a Belleville washer shape, etc. The plates may be thicker or thinner than those used in the load washers 100, 200 and 300, and the thicknesses of the two plates may be different. Preferably the plates are designed so that shear loads are not transmitted to the load sensors 120, 220 and 320. For example, in load washer 200 not only is plate 210 prevented from movement horizontally by flange 203 to prevent transmission of shear loads to the load sensor 220, but a key 211 on plate 210 which extends in opening 207 also prevents rotational movement of plates 202, 210 relative to each other.

Load washers made in accordance with the present invention are of very low cost as compared to available load washers, and therefore may be disposable. As such, where leaving them in place will not detract from the performance of an assembly, they may be left in place. The low cost also permits a large number to be used at the same time so a plurality of bolts may be tested simultaneously.

Furthermore, the load washers of this invention are of very low profile and permit, where a plurality of zones of intersection are incorporated, sensing of load distribution data, unlike that which is available with conventional load washers which usually provide only total load data. Thus, load washers of the present invention may be used to discern not only total loads, but also differences in loads at different locations (zones) around the washer, to indicate the moments of the force or load applied. Existing load washers usually provide only averages of the load applied and do not provide moment information.

Where accurate absolute load distribution and moment information is desired, it is preferable to calibrate the load washers before use to establish a relationship between load sensor output and actual load. This will serve to eliminate non-uniformities in the load washer, such as those attributable to departures in parallelism between the outer surfaces of the plates, discontinuities on the inner surfaces, non-uniformities in the load sensor itself, etc. Calibration will provide a profile unique to the individual load washer.

Like load washers 100 and 200, load washer 300 may be calibrated before use to establish a relationship between the load washer output and actual load. As such, the load washer may be loaded to a selected number of loads over a range which includes the range of intended use. Outputs would then be acquired from the four zones Z1 and would be retained as a function of the known applied loads. This data which would provide a profile for and serve as a calibration for a particular load washer, and would be retained for later comparison with data generated during the actual use of the load washer. It will be apparent that when a load washer 300 is assembled in a bolted or other application, the calibration information and profile will provide information about each of the zones Z1. As was the case with load washers 100 and 200, integration can be used to determine the total load applied, or the data from each of the zones Z1 can be used to indicate non-uniform or "off-axis" loading and its distribution.

From the foregoing, it will be apparent to those skilled in the art that modifications departing from the specific embodiments described and illustrated may be made without departing from the spirit and scope of the present invention, and all such are intended to be embraced by the claims.

What is claimed is:

1. A thin circular load washer comprising:
    a first thin plate defining an outer perimeter and a central opening,
    a second thin plate defining an outer perimeter and a central opening, and
    a load sensor positioned and permanently mounted between said plates, said load sensor defining a central opening and comprising,
    first electrode means on a first thin plastic sheet,
    second electrode means on a second thin plastic sheet confronting said first electrode means to define a plurality of pairs of confronting electrodes defining a plurality of points of confrontation of said first and second electrode means, said points of confrontation being distributed in equidistantly spaces zones around said load washer and within said outer perimeters,
    a pressure sensitive resistive material interposed between said pairs of electrodes at each of said points of confrontation, and
    conductors for all of said first and second electrode means extending beyond said outer perimeters and existing only at one peripheral location on said perimeters, and each said conductor terminating in a contact.

2. A load washer in accordance with claim 1, and wherein the first plate is thin and flat, and said second plate is thin and flat and defines an upstanding peripheral flange surrounding said first plate, and said load sensor is mounted therebetween.

3. A load washer in accordance with claim 1, and wherein said plates define means for preventing the transmission of shear loads to said load sensor.

4. A load washer comprising:
    a first thin plate defining an outer perimeter,
    a second thin plate defining an outer perimeter, and
    a load sensor positioned between said plates, said load sensor comprising,
    first electrode means,
    second electrode means confronting said first electrode means within said outer perimeters,
    a pressure sensitive resistive material between said electrode means at each said intersection,
    conductors for said first and second electrode means extending beyond said outer perimeters, and each said conductor terminating in a contact,
    and wherein said first and second electrode means each include a plurality of electrodes defining plural points of confrontation, said points of confrontation being distributed in circumferentially equidistantly spaced zones.

5. A load washer in accordance with claim 4, and wherein there are at least three equidistantly circumferentially spaced zones.

6. A load washer in accordance with claim 5, and wherein said load washer is generally circular in plan view and said zones are generally radially equidistant from the center of said loud washer and are spaced equidistantly from each other along a circle generated about the center of said load washer.

7. A load washer which is generally circular in plan view defining a central opening for a bolt comprising:
    a first thin plate defining an outer perimeter,
    a second thin plate defining an outer perimeter, and
    a load sensor positioned between said plates, said load sensor comprising,
    first electrode means comprising at least two electrodes,
    second electrode means comprising at least two electrodes crossing and intersecting said first electrode means to define points of confrontation thereof within said outer perimeters, said electrode means defining plural points of confrontation, said points of confrontation being distributed in at least three equidistantly spaced zones, said zones being generally radially equidistant from the center of said load washer and being spaced equidistantly from each other along a circle generated about the center of said load washer,
    a pressure sensitive resistive material between said electrode means at said points of confrontation, and
    conductors for said first and second electrode means extending beyond said outer perimeters, and each said conductor terminating in a contact.

8. A load washer in accordance with claim 7, and wherein said plates are thin and flat and said load sensor is thin and flat and permanently mounted therebetween.

9. A load washer in accordance with claim 8, and wherein said plates define means for preventing the transmission of shear loads to said load sensor.

10. A load washer in accordance with claim 7, and wherein the first plate is thin and flat, and said second plate is thin and flat and defines an upstanding peripheral flange surrounding said first plate and said load sensor is mounted therebetween.

* * * * *